United States Patent
Patterson et al.

[19]

[11] Patent Number: 6,107,715
[45] Date of Patent: Aug. 22, 2000

[54] NON-LINEAR SPRING SYSTEM FOR VIBRATING EQUIPMENT

[75] Inventors: Harold E. Patterson, Indiana; Paul I. Sleppy, Penn Run, both of Pa.

[73] Assignee: FMC Corporation, Chicago, Ill.

[21] Appl. No.: 08/805,261

[22] Filed: Feb. 24, 1997

[51] Int. Cl.[7] .................................................. H02K 7/065
[52] U.S. Cl. ................................ 310/81; 310/17; 310/20
[58] Field of Search ................................ 310/80, 81, 15, 310/17, 28, 29, 32, 21, 20

[56] References Cited

U.S. PATENT DOCUMENTS

| | | | |
|---|---|---|---|
| 4,455,496 | 6/1984 | Dean et al. | 310/29 |
| 4,673,833 | 6/1987 | Dean et al. | 310/29 |
| 4,701,647 | 10/1987 | Dean et al. | 310/29 |
| 4,719,376 | 1/1988 | Dean et al. | 310/29 |
| 5,287,027 | 2/1994 | Marshall et al. | 310/21 |
| 5,293,987 | 3/1994 | Marshall et al. | 198/769 |

*Primary Examiner*—Nestor Ramirez
*Assistant Examiner*—Judson H. Jones
*Attorney, Agent, or Firm*—Rockey, Milnamow & Katz, Ltd.

[57] ABSTRACT

A spring system for a vibration driver provides a non-linear stiffening reaction force as the deflection of the spring system increases. In a vibration driver, particularly an electromagnetic vibration driver, a reciprocating plate provides opposing bumpers which engage opposing elastomer blocks alternately during the stroke of the plate. Elastomer blocks include on three or four sides an elastomer impregnated fabric. The fabric controls the bulging of the elastomer block during impact by the bumper, substantially changing the spring rate of the elastomer block, to increase the resonant frequency of the spring system as the machine stroke increases. Increasing resonant frequency controls the stroke amplitude of the plate for a consistent feed rate of resonant tuned vibratory material handling equipment.

17 Claims, 4 Drawing Sheets

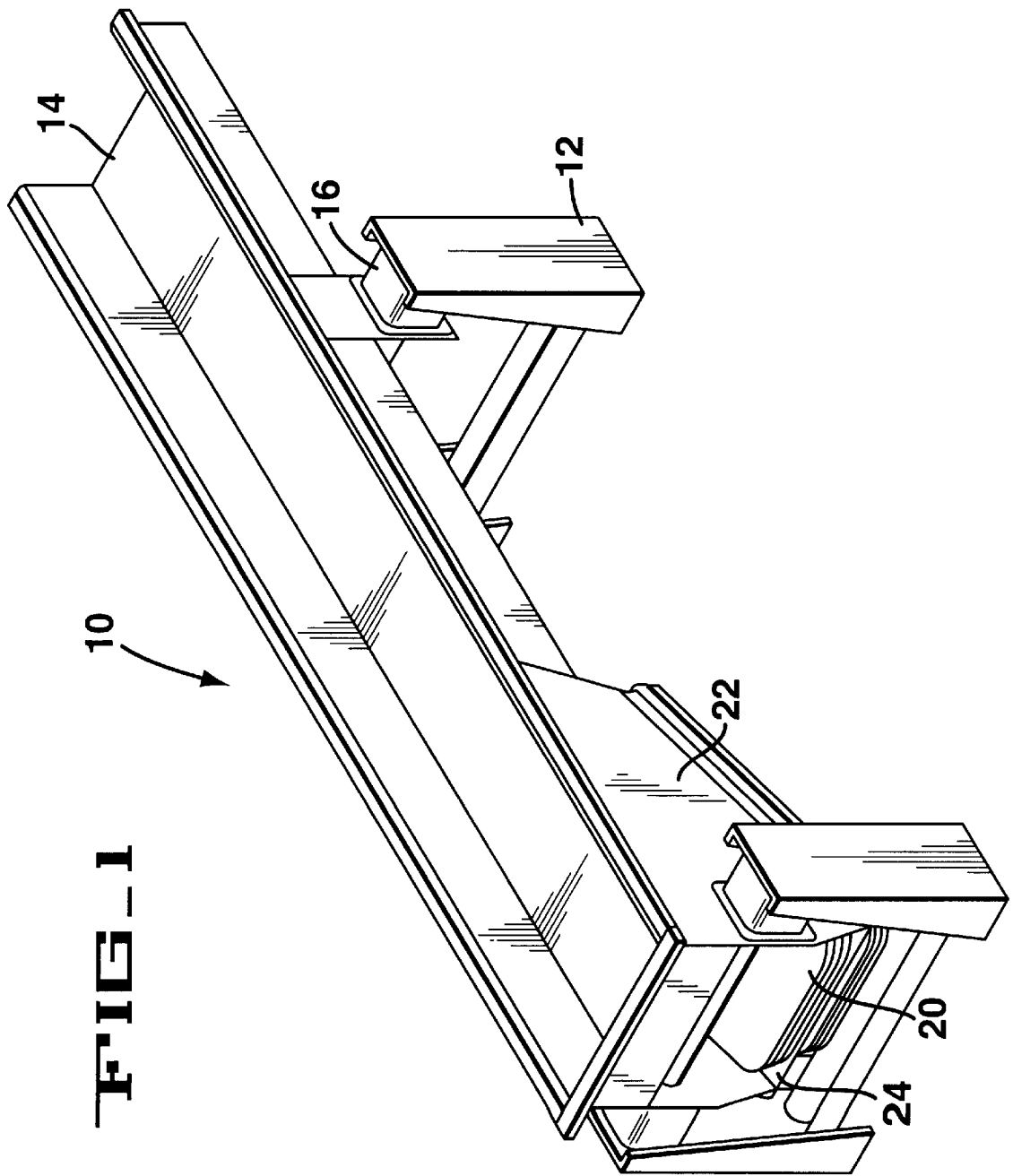

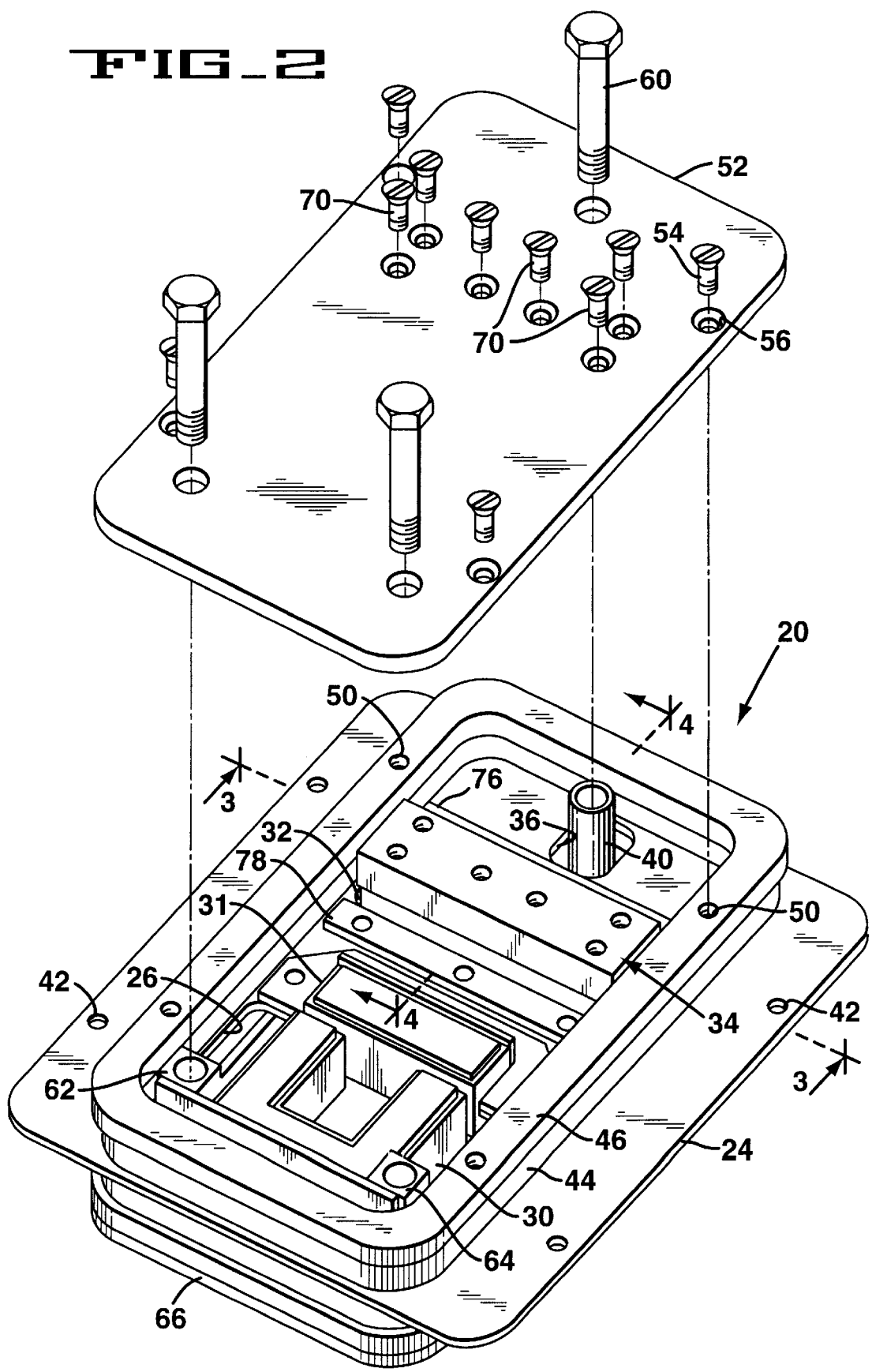

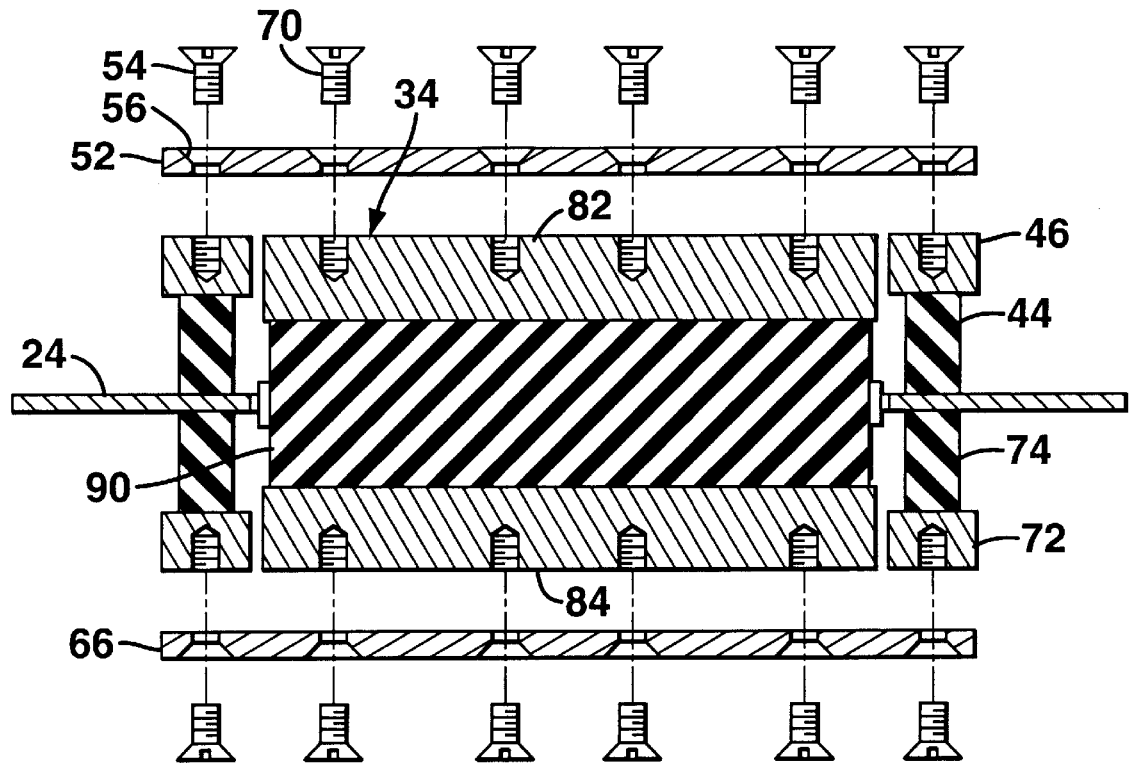
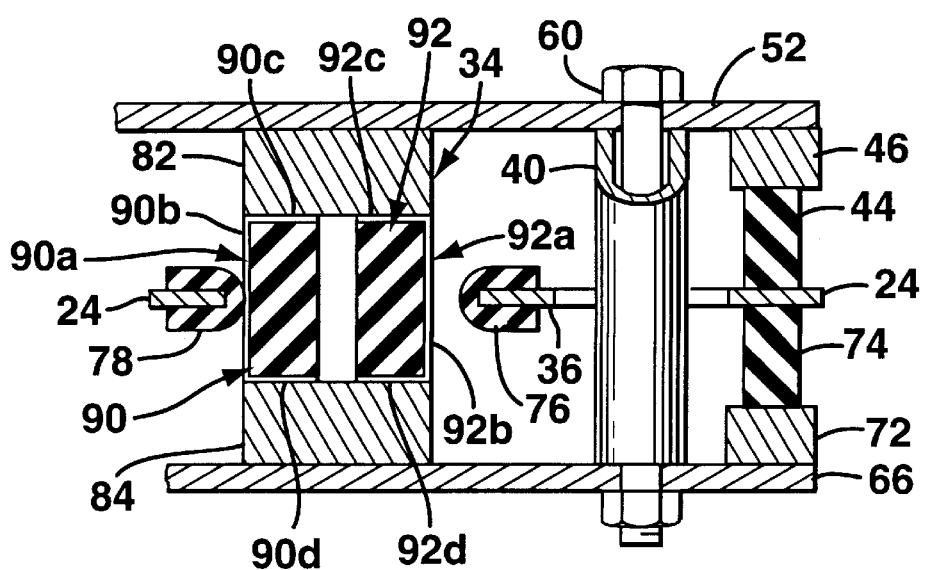

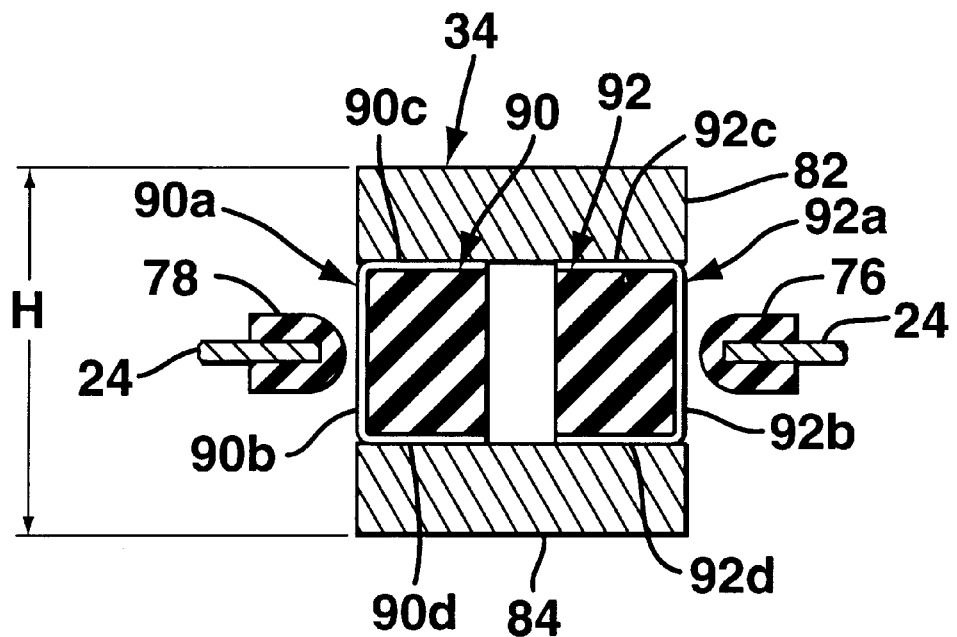
FIG_5
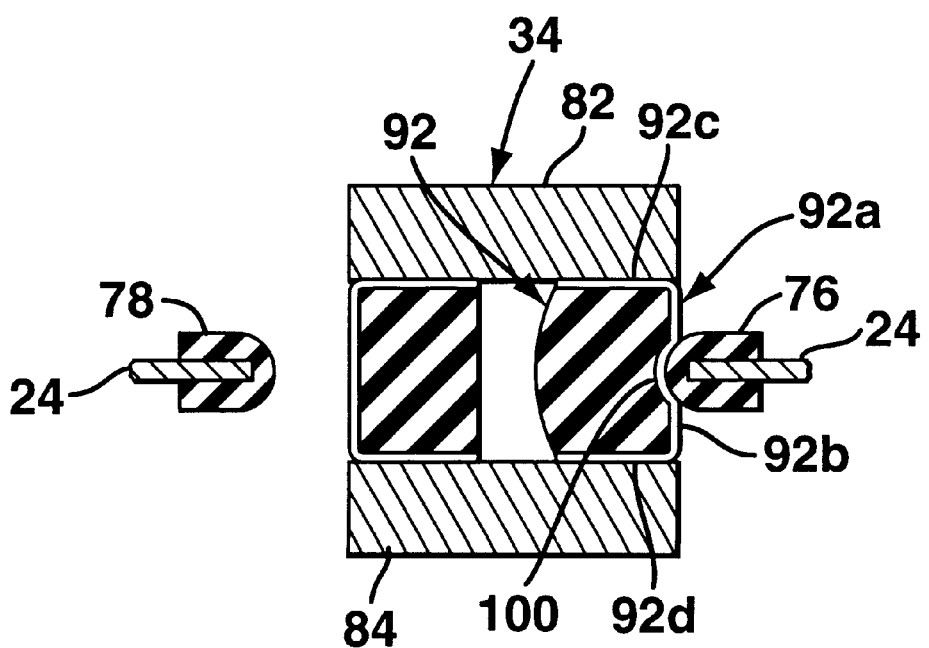
FIG_6

NON-LINEAR SPRING SYSTEM FOR VIBRATING EQUIPMENT

FIELD OF THE INVENTION

The invention relates to vibrating equipment, such as vibrating conveyor devices, and particularly to a non-linear spring system for improving the stroke stability of resonant tuned vibrating equipment. The non-linear spring system can be applied to both mechanical and magnetic drives for vibrating equipment.

BACKGROUND OF THE INVENTION

Resonant tuned vibratory material handling equipment such as feeders, screens, vibratory conveyors and vibratory parts feeders move bulk material and small parts by vibrating a tray or bed on which the material rests. The vibratory material handling equipment moves the bulk material or small parts back-and-forth at a predetermined frequency, a predetermined stroke and a preselected angle relative to the horizontal. This motion moves material by accelerating the tray in an upward and forward stroke toward the discharge thereby increasing the normal force between the material and the tray and accelerating the material along with the tray. On the reverse stroke, the tray is accelerated down and rearwardly, away from the discharge thereby "unweighting" the material, reducing the normal force between the tray and the material to a lesser value, but not necessarily to zero. This movement allows the material to continue to travel in the feed direction, toward a discharge while the tray is moving in the opposite direction.

A requirement of this type of vibratory material handling system is that in order to maintain a consistent feed rate, the stroke amplitude of the tray must remain fairly constant. The stroke amplitude, however, on a resonant tuned machine is inherently unstable. The stroke will change with changes in material load, machine mass (including material adhering to the tray), and driving force. This is further compounded on closing-gap-magnetically-excited-machines by the fact that the driving forces is a function of the inverse of the air gap between the magnet and the armature which decreases as the stroke increases.

U.S. Pat. No. 5,293,287 describes an electromagnetic drive with a multipart spring system which uses sequential contacting between the moving mass and separate elastomeric springs to cause an increase in the spring force of the spring system as the stroke of the electromagnet increases. This system uses two side elastomeric springs which engage a moving plate initially, and a center elastomeric spring which engages the moving plate subsequently.

It would be desirable to increase the nonlinearity of a single elastomeric spring, so as to increase the total spring force non-linearly with increasing electromagnetic stroke, by modifying the elastomeric spring block itself, which is impacted by the moving mass.

It would be desirable to provide a resonant tuned vibration drive having an electromagnetic or mechanical driver which includes an elastomeric spring block arranged to be impacted by increasing stroke of the moving mass driven by the driver, wherein the spring block is modified to produce a non-linearly increasing spring rate in response to an increasing stroke of the moving mass. It would be desirable to provide such a device which would ensure that the stroke amplitude of the moving mass remains fairly constant to provide a consistent feed rate of bulk material transported by the moving mass.

SUMMARY OF THE INVENTION

The present invention provides a fabric covered elastomer spring mounted to a first mass which is impacted by a relatively moving second mass which improves the stability of resonant tuned machines by increasing the resonant frequency of the system as the stroke amplitude increases. The resonant frequency is increased by providing a spring system whose rate increases non-linearly with deflection thereof. The invention is an improvement over prior methods by increasing durability and the ability to package a higher, non-linear spring rate in a limited available housing space. The non-linear increasing spring rate allows for the initial impact between moving mass and spring to be reduced. A spring is provided which is less susceptible to spring rate changes due to thermal expansion.

The invention provides a vibrator having a housing which includes a center plate to be mounted to, for example, a conveyor trough. The center plate is movable within the housing in a reciprocating fashion. The vibrator can be a mechanical, electromagnetic or other type vibrator. In the case of an electromagnetic vibrator, the housing contains an armature fastened to the center plate, and the housing holds an electromagnet fixedly therein. When the electromagnet is energized, the armature is drawn toward the poles of the electromagnet in a well-known operating manner. The center plate provides a rectangular aperture which surrounds a spring structure mounted fixedly within the housing. The spring structure includes rigid top and bottom blocks mounted to inside surfaces of top and bottom covers of the housing, and precompressed elastomer blocks arranged between the two rigid blocks. On opposite inside edges of the center plate are arranged elastomer or metal bumpers having rounded surfaces facing the elastomer blocks.

The elastomer blocks serve as non-linear spring elements. These elastomer blocks are surrounded on three or four sides by reinforcing threads in the form of an elastomer impregnated fabric. The fabric is bonded to the elastomer block and controls the "bulge factor" or expansion of the rubber as the bumper presses into the elastomer block. The fabric is also bonded to inside facing surfaces of the rigid top and bottom blocks.

Thus, the elastomer blocks are fixed to one mass of a resonant tuned machine (the housing) and the bumpers are attached to the respective other mass (the armature). Although the elastomer blocks are described as fixed to the housing and the bumpers movable with respect to the housing, the relationship could be reversed. As the vibrator operates, the non-linear spring assembly could oscillate back and forth, contacting a bumper as it travels a predetermined distance in either direction.

By controlling the bulging of the elastomer block, the non-linear rate of the spring element is magnified. As the deflection of the elastomer block increases, a point is reached where the fabric goes into tension and the spring rate versus deflection increases substantially. The resultant effect of the spring system is that the resonant frequency of the system increases as the machine stroke increases, thereby requiring a non-linear increasing force input to drive the stroke higher.

BRIEF DESCRIPTION OF THE DRAWINGS

FIG. 1 is a perspective view of a vibrating trough conveyor incorporating the present invention;

FIG. 2 is an exploded perspective view of a vibration generator of the present invention;

FIG. 3 is a sectional view taken generally along line 3—3 of FIG. 2;

FIG. 4 is a sectional view taken generally line 4—4 of FIG. 2;

FIG. 5 is a partial schematic sectional view of the spring system shown in FIG. 4 in a first position; and FIG. 6 is a schematic sectional view of the spring system shown in FIG. 5 in a second position.

DETAILS OF THE PREFERRED EMBODIMENT

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

FIG. 1 illustrates the general environment of the invention. A conveyor trough 14 is mounted through vibration isolators 16 to legs 12. In operation, vibration of the trough 14 transports material (not shown) along the length of the trough.

The conveyor of FIG. 1 includes an electromagnetic drive means 20 attached to wing plates 22 which are integral with the conveyor trough 14. The attachment of the drive is facilitated by bolting the drive means 20 through a center plate 24 of the drive means to wing plates 22.

FIG. 2 is a view of the electromagnetic drive means 20 showing features of the present invention. The center plate 24 divides a top portion of the drive means with a bottom portion, but each portion is virtually identical with the exception that a power cord, a source of electrical energy, not shown, enters the electromagnetic drive means from the bottom of the unit in order to provide power to energize the electromagnet system. The drive means will be described starting with the center plate 24.

The center plate 24 is provided with two major apertures therein. The first major aperture 26 is an opening at one end of the center plate that will accommodate an electromagnet 30 and an armature 31. The second major aperture 32 is a rectangular opening through the center plate. This second major aperture 32 accommodates a set of springs shown generally as 34 as will be described below.

A lesser aperture 36 is also provided in the center plate 24 in the location shown. This aperture accommodates a tube 40 which serves as a precompression spacer that prevents too much compression on the spring system and is of a certain length to give the desired amount of spring precompression. Apertures 42 are mounting apertures that allow the drive to be fastened, as by bolts, to the wing plates of the conveyor.

One spring of the spring system is the upper constant spring 44. This spring is an elastomeric spring of generally rectangular shape and rectangular cross-section that is bonded to the top surface of the center plate and surrounds or defines the interior of the electromagnetic drive. In a preferred embodiment this upper constant spring is an elastomeric frame having curvilinear transitional corners connecting the sides of the rectangular frame which describe the upper constant spring. The upper constant spring is shown as a continuous frame of material, however, it is contemplated that it be discontinuous if desired.

An inflexible upper frame 46 is bonded to the upper constant spring. In a preferred embodiment this is a metallic element, however it could be a nonmetallic element as well. The upper frame 46 has the general shape of the upper constant spring but is somewhat larger in the preferred embodiment shown. Threaded apertures 50, for example, are provided in the upper frame.

The upper frame 46 is fastened to the top plate 52 by means of fasteners 54 passing through apertures 56 in the top plate into the threaded aperture 50 of the upper frame. It is contemplated that the top plate and upper frame could be integrally formed as a single unit.

The top plate 52 which is also known as the first magnet support web as it may support the electromagnet 30 between it and the bottom plate or second magnet support web 66, is provided with numerous apertures including three apertures which accommodate bolts which respectively pass through the top plate and through electromagnet stanchions 62, 64 and the tube 40. These bolts then pass through a bottom plate or second magnet support web 66, which is a mirror image of the top plate 52 with the addition of an aperture to accommodate a power cable, and is secured with nuts (FIG. 4). Alternatively, rather than using nuts as fasteners, the bolts 60 could be threaded into threaded apertures in the bottom plate or into threaded apertures in an ancillary weight or weights that could be carried adjacent the bottom plate to help tune the electromagnetic drive means.

A plurality of fasteners 70 pass through apertures in the top plate to secure the set of springs 34 to the top plate. Similar fasteners are used to secure the set of springs to the bottom plate as is shown in FIG. 3. The spring system can best be seen in FIGS. 3 and 4. In these figures, the bottom plates 66, a lower frame 72, a lower constant spring 74, and first and second bumpers 76, 78, can all be seen. The lower frame 72 and the lower constant spring 74 are similar in shape and function as the upper frame 46 and the upper constant spring 44 respectively. The bumpers 76, 78 can be elastomeric or metal or other durable material suitable for the service.

As can be seen in FIG. 4, the set of springs 34 is composed of several elements. A top block 82 is fastened to an underside of the top plate 52. A bottom block 84 is fastener to a top side of the bottom plate 66. Between these blocks there is located elastomer blocks 90, 92, respectively. Each elastomer block 90, 92 is preferably covered on at least three sides by reinforcing threads such as a fabric piece 90a, 92a respectively. The fabric piece is preferably elastomer impregnated. In the preferred embodiment, the respective fabric pieces 90a, 92a at least cover an outside vertical side 90b, 92b respectively; top sides 90c, 92c respectively; and bottom sides 90d, 92d respectively. The fabric pieces 90c, 92c; and 90d, 92d are bonded to an underside of the top rigid block 82, and an upper surface of the bottom rigid block 84, respectively.

Returning to FIG. 2, it can be seen that the armature 31 is fastened to the center plate 24 and passes through the center plate approximately an equal amount on each side of the center plate. The electromagnetic 30 is attached to support structure integral with the stanchions 62 and 64 so that it moves with the top and bottom plates but not with the center plate 24. The electromagnet is shown in a "stripped down" embodiment in that coil windings have not been shown and the device has not been encased in a "potting" material as would normally be the case in a production unit. In operation, when the electromagnet is energized, the armature 31 is drawn toward the poles of the electromagnet in the well-known operating manner.

In the preferred embodiment each mass of the two mass system will be relatively close in mass to the other. That is, the trough mass, wing plates, center plate and armature will be close in mass to the top and bottom plates, the spring systems, the electromagnet and any ballast weights needed to get the two mass close in mass to each other.

The upper and lower constant springs 44, 74 respectively, are sized to have a resonant frequency at the resonance of the feeder system. The set of springs 34 are sized to provide resistance which increases in a virtual non-linear progression as the center plate mounted armature approaches the electromagnet. This is done by means of the bumpers and springs interfacing with each other. For example, as shown in FIG. 4, the rounded leading edge of the elastomeric bumper 76 will provide increasing resistance as more surface area of the bumper 76 contacts the sides of the elastomeric block.

The center plate 24 will continue to move leftwardly as the electromagnet continues to pull the armature 31 toward the pole pieces of the electromagnetic. The spring system develops greater resistance as the air gap of the magnet decreases to within 0.1 inch. At about this point of linear travel the magnet will be caused to stop as the electromagnet is turned off allowing the spring system to retract toward a position of repose. The spring system will rebound such that the center plate elastomeric bumper 78 will contact the respective other elastomeric block.

The electromagnet in the preferred embodiment, would be energized for one sign wave of incoming current and then turned off for a second sign wave. This would result in thirty cycles per second operating speed of the drive means. Other combinations are possible such as, one for one sign waves cycle, off for two sign wave cycles, on for one sign wave cycle, off for three sign wave cycles, depending on the desired operating speed and the feed line frequency.

Various spring rate curves, which appear to be close to non-linear are possible by adjusting the spring rate variable provided by use of elastomeric springs. The cross-sectional dimension of the elastomeric components can be changed. The composition of the elastomers can be changed. The relative sizes of the elastomer blocks can be changed. These, and other changes are possible and are encompassed by the invention.

The drive characteristics of the feeder being driven by the drive means can also be affected by adding mass, in the form of weights, to the first mass or to the second mass. It would be useful if the weight were added to the second mass in the event that there was an increase in mass being conveyed by the host feeder or conveyor trough. Such weight could be fastened to the bottom plate of the illustrated embodiment.

FIGS. 5 and 6 illustrate the mechanism of the present invention. FIG. 5 illustrates the neutral position of the plate 24 with respect to the drive mechanism. The height H which is shown in FIG. 5 is the installed height between the top and bottom plates 52, 66. The sizing of the elastomer blocks 90, 92 is such that the height H causes a precompression of the elastomer blocks 90, 92 as installed.

FIG. 6 illustrates a full stroke position, that is the electromagnet 30 has pulled the armature 31 and hence the plate 24 fully to the left with respect to the illustration in FIG. 2.

As shown in FIG. 6, when the plate 24 is moved leftwardly, the elastomer bumper 76 compresses an increasingly greater, concave depression 100 into the elastomer block 92. By controlling the bulging of the elastomer block 92, the non-linear rate of the resistance to movement of the bumper 76 into the block 92 is magnified. As the deflection of the block increases, a point is reached where the fabric piece 92*b* is tensed and the spring rate versus deflection increases substantially. The resultant effect on the machine is that the resonant frequency of the system increases as the machine stroke increases, thereby requiring a non-linearly increasing force input to drive the stroke higher.

The fabric pieces 92*c*, 92*d* assist in bonding the block 92 to the upper and lower rigid blocks 82, 84 and provide anchorage for the fabric piece 92*b* during this tensing.

The interaction of the bumper 78 with the elastomer block 90 on the return stroke of the plate 24 is substantially identical to the interaction of the bumper 76 with the elastomer block 90. The elastomer block 90 is also configured and attached substantially identically to the elastomer block 92.

Although for purposes of clarity of description, single elastomeric blocks 90, 92 are shown opposing each of the bumpers 76, 78 it is possible to include discrete multiple elastomer blocks facing each bumper 76, 78 such as described in the context of U.S. Pat. No. 5,293,987 which utilizes center blocks and side blocks such that the approaching bumper 76, 78 engages sequentially first the side blocks and then the center block to cause a progressive engagement between the bumper and the elastomer blocks to further increase the non-linearity of the spring rate versus distance of stroke relationship. In the present invention, staggered discrete elastomer blocks at least one of which includes the fabric covered block such as 90, 92, could be used facing each bumper 76, 78, wherein side blocks would be longer and protrude more closely to the bumpers 76, 78 than a respective center block. In such an arrangement, each of the side and center blocks could include the fabric-covered elastomer block bonded above and below to the respective fixed rigid blocks. The progressive engagement of bumpers to elastomeric blocks is described for example in U.S. Pat. No. 5,293,987 and herein incorporated by reference.

In the preferred embodiment for the elastomer blocks 90, 92, the fabric material for the fabric 90*a*, 92*a* is preferably 1/16" thick, although other thicknesses are workable, and is composed of FABREEKA, a product of Fabreeka International P.O. Box P0210, Stoughton, Mass. 02072-0002, which is a layer of tightly twisted, closely woven lightweight duck impregnated with an elastomeric compound having a durometer hardness of 90. The elastomeric material of the blocks 90, 92 is composed of polyisoprene. The fabric is bonded to the elastomer blocks by being placed in the pressure mold with the elastomer block being formed, and the two components, block and fabric are heated under pressure to be "vulcanized" together. Although a heat bonding of the fabrics 90*a*, 92*a* to the blocks 90, 92 is an advantageous means of bonding, other means such as adhesively bonding or mechanical fastening are also encompassed by the invention. The fabric pieces 90c, 92c; 90*d*, 92*d* are bonded to the upper and lower rigid blocks 82, 84 by use of an epoxy suitable to bond the elastomer to the mild steel of the blocks 82, 84.

From the foregoing, it will be observed that numerous modifications and variations can be effected without departing from the true spirit and scope of the novel concept of the present invention. It is to be understood that no limitation with respect to the specific embodiments disclosed herein is intended or should be inferred. The disclosure is intended to cover by the appended claims all such modifications as fall within the scope of the claims.

The invention claimed is:

1. A vibration driver, comprising:
   a housing;
   a plate carried by said housing and movable linearly with respect thereto, said plate having an impact portion;
   an electromagnet and a cooperating armature, one of said electromagnet and said armature connected to said housing, and the respective other connected to said plate, said armature spaced from said electromagnet;

an elastomer block held at a position within said housing and arranged to be impacted by said impact portion of said plate upon movement of said plate, said impact portion shaped to create a concentrated pressure on an area of said block, said block supported at its ends as a beam;

a fabric piece, attached to said elastomer block on a facing side of said elastomer block facing said portion of said plate, to provide an increasing, non-linear spring rate of said elastomer block as said portion moves into said elastomer block.

2. The device according to claim 1, wherein said impact portion of said plate comprises a member having an arcuate leading surface for impacting said elastomer block.

3. The device according to claim 2 wherein said portion is composed of an elastomeric material.

4. The device according to claim 1 further comprising a further elastomer block held at a position within said housing and having a second fabric piece attached thereto on a side of said further elastomer block;

a further portion of said plate arranged to impact said second elastomer portion on said side having said second fabric piece, said portion and said further portion arranged facing said elastomer block and said further elastomer block in opposite directions.

5. A vibration driver, comprising:

a housing;

a plate carried by said housing and movable linearly with respect thereto;

an electromagnet and a cooperating armature, one of said electromagnet and said armature connected to said housing, and the respective other connected to said plate, said armature spaced from said electromagnet;

an elastomer block held at a position within said housing and arranged to be impacted by a portion of said plate upon movement of said plate;

a fabric piece, attached to said elastomer block on a facing side of said elastomer block facing said portion of said plate, to provide an increasing, non-linear spring rate of said elastomer block as said portion moves into said elastomer block;

a further elastomer block held at a position within said housing and having a second fabric piece attached thereto on a side of said further elastomer block;

a further portion of said plate arranged to impact said second elastomer portion on said side having said second fabric piece, said portion and said further portion arranged facing said elastomer block and said further elastomer block in opposite directions;

wherein said elastomer block and said further elastomer block are captured between a top rigid block and a bottom rigid block, the top and bottom rigid blocks secured fixedly to said housing, said top and bottom rigid blocks compress said elastomer block and said further elastomer block therebetween when installed into said housing.

6. A vibration driver, comprising:

a housing;

a plate carried by said housing and movable linearly with respect thereto;

an electromagnet and a cooperating armature, one of said electromagnet and said armature connected to said housing, and the respective other connected to said plate, said armature spaced from said electromagnet;

an elastomer block held at a position within said housing and arranged to be impacted by a portion of said plate upon movement of said plate;

a fabric piece, attached to said elastomer block on a facing side of said elastomer block facing said portion of said plate, to provide an increasing, non-linear spring rate of said elastomer block as said portion moves into said elastomer block;

a further elastomer block held at a position within said housing and having a second fabric piece attached thereto on a side of said further elastomer block;

a further portion of said plate arranged to impact said second elastomer portion on said side having said second fabric piece, said portion and said further portion arranged facing said elastomer block and said further elastomer block in opposite directions; and wherein said elastomer block and said further elastomer block are spaced apart in a direction of movement of said plate.

7. The device according to claim 4 wherein said fabric piece and said second fabric piece are wrapped around three sides of said elastomer block and said further elastomer block, said fabric piece and said second fabric piece encapsulated into said elastomer block and said further elastomer block respectively.

8. The device according to claim 4 wherein said plate comprises a first aperture and said portion and further portion comprise bumper portions formed along opposing edges of said first aperture, movement of said plate in opposite directions impacting one of said bumper portions into one of said elastomer block respectively.

9. The device according to claim 8 wherein each of said bumper portions comprises a prone U-shaped member clasping said edge of said plate and providing an arcuate surface facing one of said elastomer block or said further elastomer block respectively.

10. The device according to claim 1 wherein said fabric piece which covers at least three sides of said elastomer block including a top side, a facing side and a bottom side; and a top rigid block overlying said top side of said elastomer block, and a bottom rigid block underlying a bottom side of said elastomer block, said fabric piece adhered to said top and bottom rigid blocks.

11. A vibration device, comprising:

a first mass;

a second mass movable with respect to said first mass;

a vibrator for translating said mass toward-and-away from said first mass repeatedly;

a bumper arranged on said first mass;

an elastomer block arranged on said second mass in alignment with said bumper for impact therewith on a front face of said elastomer block during movement of said second mass with respect to said first mass, said elastomer block fixed to said second mass at ends of said elastomer block, supported as a beam to have an unsupported back face, said elastomer block having reinforcing threads across at least one face thereof, fastened to said elastomer block to restrict bulging of said elastomer block under influence of said bumper.

12. The device according to claim 11 wherein said reinforcing threads are applied to said front face of said elastomer block facing said bumper.

13. A device according to claim 12, wherein said reinforcing threads are entangled into a fabric configuration which is impregnated with elastomer.

14. The device according to claim 11, further comprising a further bumper arranged on said first mass, and a further elastomer block having further reinforcing threads on at least one face thereof, and arranged on said second mass, said bumper and said further bumper facing said elastomer block and said further elastomer block respectively in opposite directions.

15. A vibration device, comprising:

a first mass;

a second mass movable with respect to said first mass;

a vibrator for translating said mass toward-and-away from said first mass repeatedly;

a bumper arranged on said first mass;

an elastomer block arranged on said second mass in alignment with said bumper for impact therewith during movement of said second mass with respect to said first mass, said elastomer block having reinforcing threads across at least one face thereof, fastened to said elastomer block to restrict bulging of said elastomer block under influence of said bumper;

further comprising a further bumper arranged on said first mass, and a further elastomer block having further reinforcing threads on at least one face thereof, and arranged on said second mass, said bumper and said further bumper facing said elastomer block and said further elastomer block respectively in opposite directions;

wherein said reinforcing threads and said further reinforcing threads comprise fabric pieces wrapped around three sides of each of said elastomer block and further elastomer block respectively, said three sides being a top side, a bottom side, and a facing side facing the respective bumper and further bumper; and said elastomer block and said further elastomer block compressed between said top side and said bottom side thereof by rigid structure of said second mass.

16. The device according to claim 15, wherein said reinforcing threads and said further reinforcing threads are composed of tightly twisted, closely woven lightweight duck.

17. The device according to claim 16, wherein said elastomer block and said further elastomer block are composed of polyisoprene.

* * * * *